Dec. 8, 1959 — A. P. KLASING ET AL — 2,916,053

PACKAGING MATERIAL

Original Filed May 14, 1954 — 2 Sheets-Sheet 1

INVENTORS
ARTHUR P. KLASING
WILLIAM J. RICE
BY
ATTORNEY

Dec. 8, 1959 A. P. KLASING ET AL 2,916,053
PACKAGING MATERIAL
Original Filed May 14, 1954 2 Sheets-Sheet 2

*INVENTOR*
ARTHUR P. KLASING
WILLIAM J. RICE
BY
ATTORNEY

United States Patent Office 2,916,053
Patented Dec. 8, 1959

2,916,053

PACKAGING MATERIAL

Arthur P. Klasing, Webster Groves, and William J. Rice, University City, Mo., assignors to Central States Paper & Bag Co., St. Louis, Mo., a corporation of Missouri Original application May 14, 1954, Serial No. 429,853. Divided and this application January 12, 1956, Serial No. 558,695

1 Claim. (Cl. 138—49)

This invention relates in general to tubing, bags, and similar fabricated materials for enclosing articles capable of being packaged and more particularly, to certain new and useful improvements in such packaging materials and in means and methods of making the same. This application is a division of our co-pending application Serial No. 429,853, filed May 14, 1954, now Patent No. 2,805,973.

It is the primary object of the present invention to provide means for fabricating thermoplastic synthetic resin films, such as polyethylene and the like, into packaging materials, such as bag-forming tubing and bags made from such tubing.

It is another object of the present invention to provide means and methods for manufacturing packaging materials of the type stated from thermoplastic synthetic resin films in a highly economical, continuous, efficient and rapid manner.

It is a further object of the present invention to provide a packaging device in the nature of a bag which is uniquely adapted for enclosing meat, poultry, or any other articles of merchandise suitable for display and sale in retail shops, department stores, supermarkets, and the like.

With the above and other objects in view, our invention resides in the novel features of form, construction, arrangement, and combination of parts presently described and pointed out in the claim.

In the accompanying drawings (two sheets)—

Figure 1:
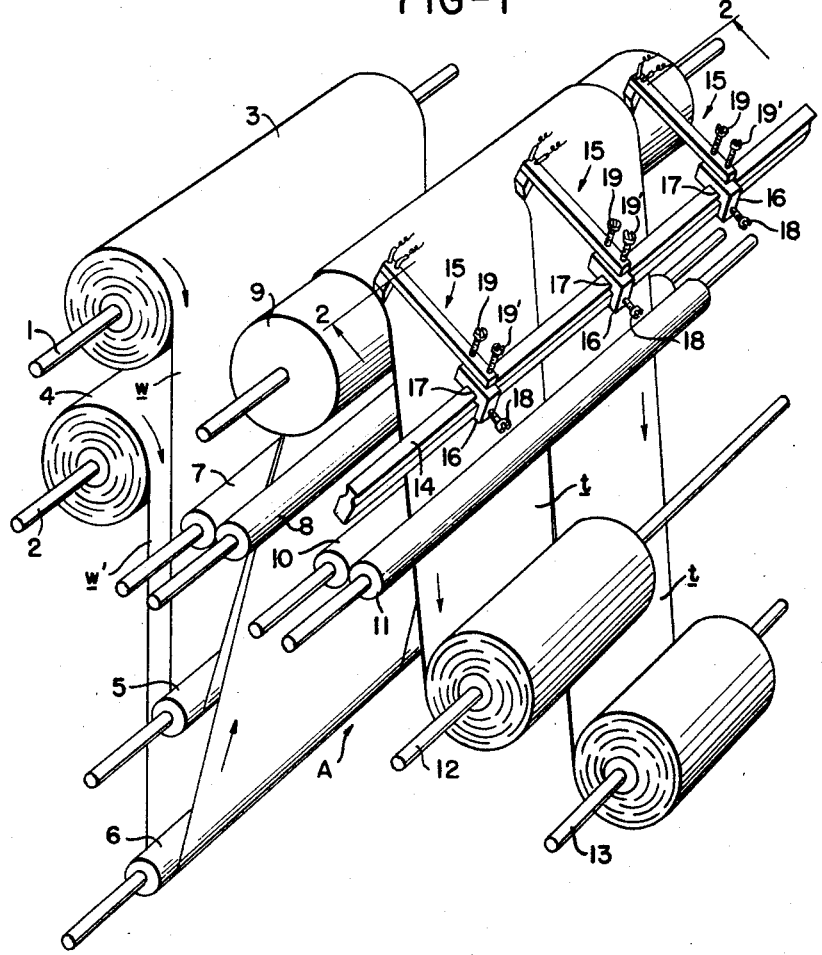
Figure 1 is a schematic view of machinery embodying the present invention and being adapted for making bag-forming tubing from thermoplastic synthetic resin films.

Referring now in more detail and by reference characters to the drawings, which illustrate a preferred embodiment of the present invention, A designates a tube-forming machine which comprises two supply-shafts 1, 2, for respectively supporting rolls 3, 4, of thermoplastic synthetic resin films, such as polyethylene or the like, and from which two separate continuous webs w, w', of film may be withdrawn, the webs w, w', preferably, though not necessarily, being of equal width and arranged in marginal registration. Operatively mounted in spaced parallel relation to the supply-shafts 1, 2, are tensioning rolls 5, 6, around which the webs w, w', are respectively trained and brought into facewise marginally registered abutment for passage between a first pair of co-operating feed rolls 7, 8, which are also disposed in parallel relation to the shafts 1, 2. Similarly mounted in spaced parallel relation to the feed rolls 7, 8, and forwardly therefrom along the path of travel of the combined webs w, w', is a large diameter platen-roll 9 and a second pair of feed rolls 10, 11. Operatively mounted beyond the second pair of feed rolls 10, 11, are separate rewind-shafts 12, 13. The bearings for the shafts 1, 2, 12, 13, the adjustable trunnions for the tensioning rolls 5, 6, the gear-drive for the feed rolls 7, 8, 10, 11, and the platen-roll 9 have not been shown inasmuch as such elements are conventional and well understood in connection with winding and reeling machinery. It is merely sufficient for present purposes to note that the driving and web-tensioning mechanism should co-act and co-operate to keep both webs w, w', taut without breaking and moving together at identical lineal speed so as to pass around the platen-roll 9 in snug unwrinkled contact against the surface thereof.

Figure 2:
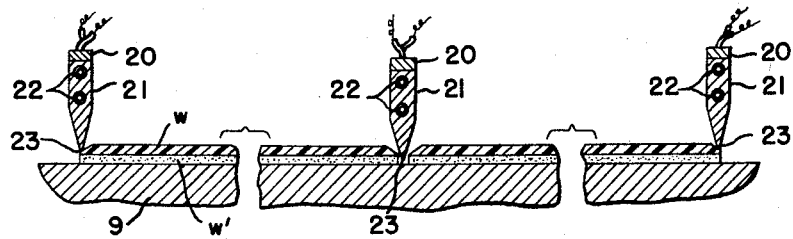
Figure 2 is a fragmentary sectional view taken along line 2—2 of Figure 1.
Figure 3:
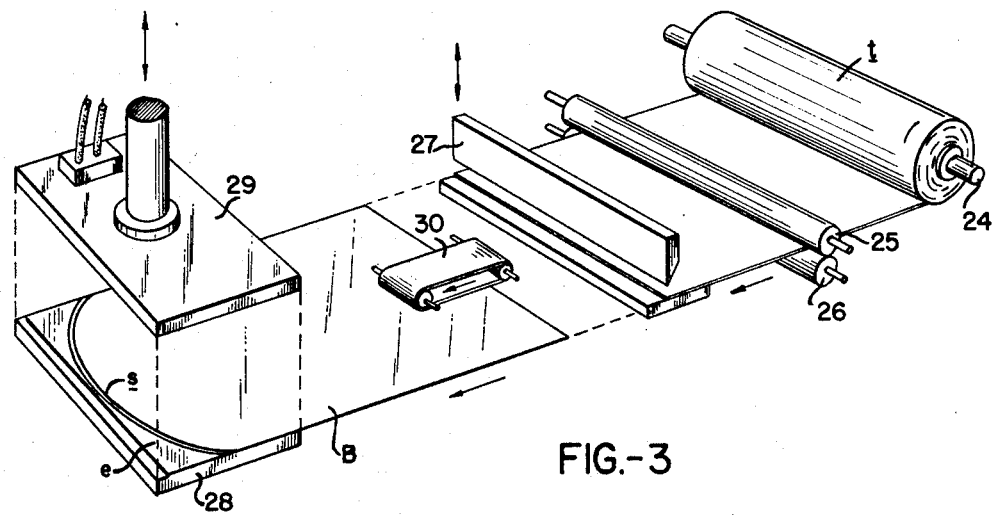
Figure 3 is a schematic view of machinery embodying the present invention and being adapted for making bags out of the bag-forming tubing.
Figure 5:
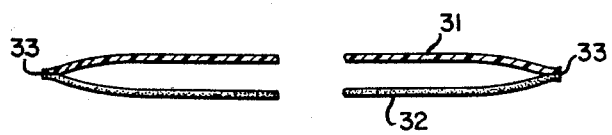
Figure 5 is a transverse sectional view taken along line 5—5 of Figure 4.
Figure 4:
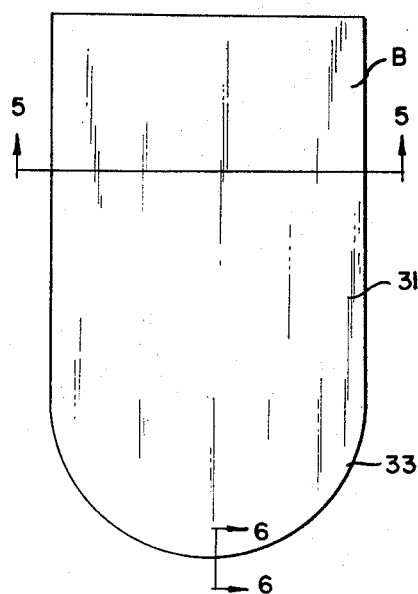
Figure 4 is a plan view of a bag constructed in accordance with and embodying the present invention.
Figure 6:
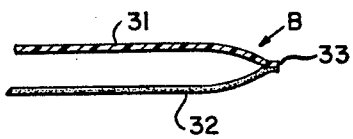
Figure 6 is a fragmentary sectional view taken along line 6—6 of Figure 4.

Rigidly mounted in outwardly spaced parallel relation to the platen-roll 9 is a dovetail bar 14 for supporting a plurality of electrically or electronic heated sealers 15, each including a base-block 16 having a dovetail slot 17 for sliding engagement with the bar 14 and being provided with a set-screw 18 for locking engagement with the bar 14, so that the sealer 15 can be slid along the bar 14 to any desired position of adjustment to accommodate the width of the webs w, w', and then tightly secured in such adjusted position. Secured to the base-block 16 by means of adjusting screws 19, 19', is a sealer-bar 20 provided at its outer end with a wedge-shaped sealer-head 21 internally equipped with a conventional resistance-type electric heating element 22 and having a narrow somewhat rounded sealing edge 23. The sealer-bars 20 may be adjusted inwardly or outwardly with respect to the base-blocks 16 by appropriate setting of the screws 19, 19', so that the outer sealers 15 will press the registering edges of the webs w, w', down with sufficient pressure and temperature to fuse them together. The central sealer 15 is adjusted so as to be practically in contact with the surface of the platen-roll 9 and slit and seal the webs w, w', at the same time, as shown in Figure 2, thereby forming two continuous webs of edge-sealed flat tubing t, which are separately rolled up on the rewind-shafts 12, 13, respectively. It will, of course, be understood that by using more than one intermediate sealer 15, it is possible to form more than two webs of tubing.

Bags can be formed from the rolls of tubing t by placing one of such rolls upon an unwind shaft 24 and feeding the tubing t preferably in a horizontal direction between intermittently driven feed rolls 25, 26, and beneath a vertically reciprocating cutting-blade or knife 27 adapted to cut the tubing t into sections of desired length. Operatively mounted along the path of travel of the tubing t forwardly with respect to the knife 27 is a flat platen 28 and a vertically reciprocating electrically heated die-plate 29 adapted to sever and seal the sections along an arcuate line in the provision of a bottom seam s and thereby forming the section into a completed bag B. Interposed between the flat platen 28 and the knife 27 is an accelerating transfer-belt 30 for shifting each cut section forwardly onto the platen 28 beneath the die-plate 29. The driving mechanism for the rolls 25, 26, the knife 27, the die-plate 29 and the transfer-belt 30 is entirely conventional and is, therefore, not shown, but it is sufficient for purposes to point out that the entire mechanism operates intermittently, so that successive lengths of tubing are fed beneath the knife 27 and during the dwell in the feeding movement the knife 27 is shifted downwardly to sever the tubing and thus cut off a bag-forming section. Thereupon, the cut-off section is fed by the transfer-belt 30 beneath the die-plate 29 and during the dwell in this feeding movement the die-plate 29 is shifted downwardly to complete the bag B. The crescent-shaped strip of excess material c, of course, may be discarded as scrap. By suitable variation in the shape of the rule on the die-plate, and the position thereof in relation to the opposite ends of the cut-off sections, it is possible to form two bags at once.

The completed bag B thus comprises two overlying identically shaped panels 31, 32, secured together along their longitudinal margins and across the bottom by a continuous and uninterrupted heat-sealed seam 33, which consists in part of the seam s formed by the die-plate 29 and in part by the marginal seals formed by the sealers 15.

By employing a transparent film for the web w and an opaque preferably white film for the web w', the bottom or back panel 32 of the bag B, when completed, will be opaque and afford an excellent display package for meats, poultry, and the like, since such food products can be placed in such a bag with the more attractive sides presented toward the transparent panel 31 and the visceral or less attractive sides toward the opaque panel 32. The bag B, when completed, has a wide mouthed or open top, so that such food products can be readily disposed therein. When suitably filled, the bag B can be heat-sealed, stapled shut, or otherwise conventionally closed.

It should be understood that changes and modifications in the form, construction, arrangement, and combination of the several parts of the packaging materials and means and methods of making the same may be made and substituted for those herein shown and described without departing from the nature and principle of our invention.

Having thus described our invention, what we claim and desire to secure by Letters Patent is:

As an article of manufacture, a tube open at both ends and consisting of two flat overlying sheets of thermoplastic material of equal width having their longitudinal margins in registration and secured together along said margins by narrow seams in which the edges of the overlying sheets are fused together in a direction which is substantially transverse with respect to the plane of the flat surfaces of the sheets.

References Cited in the file of this patent

UNITED STATES PATENTS

| | | |
|---|---|---|
| 2,313,696 | Yates | Mar. 9, 1943 |
| 2,478,181 | Coker | Aug. 9, 1949 |
| 2,542,206 | Nichols | Feb. 20, 1951 |
| 2,570,921 | Collins | Oct. 9, 1951 |
| 2,617,733 | Hensgen | Nov. 11, 1952 |
| 2,621,129 | Ramsbottom | Dec. 9, 1952 |
| 2,679,968 | Richter | June 1, 1954 |
| 2,706,497 | Shobert | Apr. 19, 1955 |
| 2,740,740 | Binnall | Apr. 3, 1956 |